(12) United States Patent
Wouter et al.

(10) Patent No.: US 11,818,447 B2
(45) Date of Patent: Nov. 14, 2023

(54) MASTER IMAGE SENSOR, SLAVE IMAGE SENSOR, IMAGING SYSTEM, AND INFORMATION PROCESSING METHOD

(71) Applicant: Sony Semiconductor Solutions Corporation, Kanagawa (JP)

(72) Inventors: Aerts Wouter, Stuttgart (DE); Victor Belokonskiy, Zaventem (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 252 days.

(21) Appl. No.: 16/983,816

(22) Filed: Aug. 3, 2020

(65) Prior Publication Data
US 2021/0044732 A1 Feb. 11, 2021

(30) Foreign Application Priority Data
Aug. 6, 2019 (EP) .................................... 19190279

(51) Int. Cl.
*H04N 23/45* (2023.01)
*H04N 5/265* (2006.01)
*H04N 23/66* (2023.01)

(52) U.S. Cl.
CPC ............. *H04N 23/45* (2023.01); *H04N 5/265* (2013.01); *H04N 23/66* (2023.01)

(58) Field of Classification Search
CPC .. H04N 5/2258; H04N 5/23203; H04N 5/265; H04N 5/23227; H04N 5/232061; H04N 5/2353; H04N 5/247; H04N 23/45; H04N 23/66; H04N 23/665; H04N 23/73; H04N 23/90; H04N 23/662
See application file for complete search history.

(56) References Cited

U.S. PATENT DOCUMENTS

| | | | |
|---|---|---|---|
| 2011/0205380 A1* | 8/2011 | Shirakawa | H04N 5/247 348/E5.043 |
| 2015/0009288 A1* | 1/2015 | Wu | H04N 13/296 348/43 |
| 2016/0182785 A1* | 6/2016 | Ogata | H04W 52/0229 348/311 |
| 2016/0335040 A1* | 11/2016 | Wen | G06F 3/1446 |
| 2018/0309919 A1* | 10/2018 | Naing | H04N 25/745 |

* cited by examiner

*Primary Examiner* — Mekonnen D Dagnew
(74) *Attorney, Agent, or Firm* — Wolf, Greenfield & Sacks, P.C.

(57) ABSTRACT

The present disclosure generally pertains to a master image sensor configured to communicate with a slave image sensor via an exposure time voltage line, wherein the exposure time voltage line is connected to a terminal of the master image sensor, the master image sensor having master circuitry, configured to:
transmit to the slave image sensor, via the exposure time voltage line, an exposure time voltage signal being indicative of an exposure time for the master image sensor; and transmit to the slave image sensor, via the exposure time voltage line, an auxiliary information voltage signal being indicative of auxiliary information for adjusting at least one imaging capture parameter of the slave imaging sensor.

20 Claims, 5 Drawing Sheets

MASTER IMAGE SENSOR, SLAVE IMAGE SENSOR, IMAGING SYSTEM, AND INFORMATION PROCESSING METHOD

CROSS-REFERENCE TO RELATED APPLICATIONS

The present application claims priority to European Patent Application 19190279.0 filed by the European Patent Office on Aug. 6, 2019, the entire contents of which being incorporated herein by reference.

TECHNICAL FIELD

The present disclosure generally pertains to a master image sensor, a slave image sensor, an imaging system, and an information processing method.

TECHNICAL BACKGROUND

Generally, it may be desirable to image a scene with two or more image sensors (or cameras), for example, in the case that two color sensors (e.g. RGB sensors) acquire an image at the same time, such as in 3D photography or 3D videography.

Thus, methods for synchronizing imaging frames of two (or more) image sensors are known.

However, known methods typically require a complex communication system between the two image sensors (usually a bus-system, such as D-Phy) and a corresponding complex control in order to synchronize or to merge the correct frames of the two (or more) image sensors with each other.

Although there exist techniques for synchronizing imaging frames with each other, it is generally desirable to provide a master image sensor, a slave image sensor, an imaging system, and an information processing method.

SUMMARY

According to a first aspect, the disclosure provides a master image sensor configured to communicate with a slave image sensor via an exposure time voltage line, wherein the exposure time voltage line is connected to a terminal of the master image sensor, the master image sensor comprising master circuitry, configured to: transmit to the slave image sensor, via the exposure time voltage line, an exposure time voltage signal being indicative of an exposure time for the master image sensor; and transmit to the slave image sensor, via the exposure time voltage line, an auxiliary information voltage signal being indicative of auxiliary information for adjusting at least one imaging capture parameter of the slave imaging sensor.

According to a second aspect, the disclosure provides a slave image sensor configured to communicate with a master image sensor via an exposure time voltage line, wherein the exposure time voltage line is connected to a terminal of the master image sensor, comprising slave circuitry configured to: receive from the master image sensor, via the exposure time voltage line, an exposure time voltage signal being indicative of an exposure time of the master image sensor; and receive from the master image sensor, via the exposure time voltage line, an auxiliary information voltage signal being indicative of auxiliary information for adjusting at least one imaging capture parameter of the slave image sensor.

According to a third aspect, the disclosure provides an imaging system comprising: an exposure time voltage line; a master image sensor being connected to the exposure time voltage signal via a terminal of the master image sensor, the master image sensor being configured to communicate with a slave image sensor via the exposure time voltage line; the slave image sensor; and host circuitry configured to: generate an exposure time voltage signal being indicative of an exposure time of the master image sensor; generate an auxiliary information voltage signal being indicative of auxiliary information for adjusting at least one imaging capture parameter of the slave image sensor; transmit, via the exposure time signal line, the exposure time voltage signal and the auxiliary information voltage signal.

According to a fourth aspect, the disclosure provides, an information processing method, comprising: generating an exposure time voltage signal being indicative of an exposure time of a master image sensor; generating an auxiliary information voltage signal being indicative of auxiliary information for adjusting at least one imaging capture parameter of a slave image sensor; transmitting the exposure time voltage signal and the auxiliary information voltage signal.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 5:
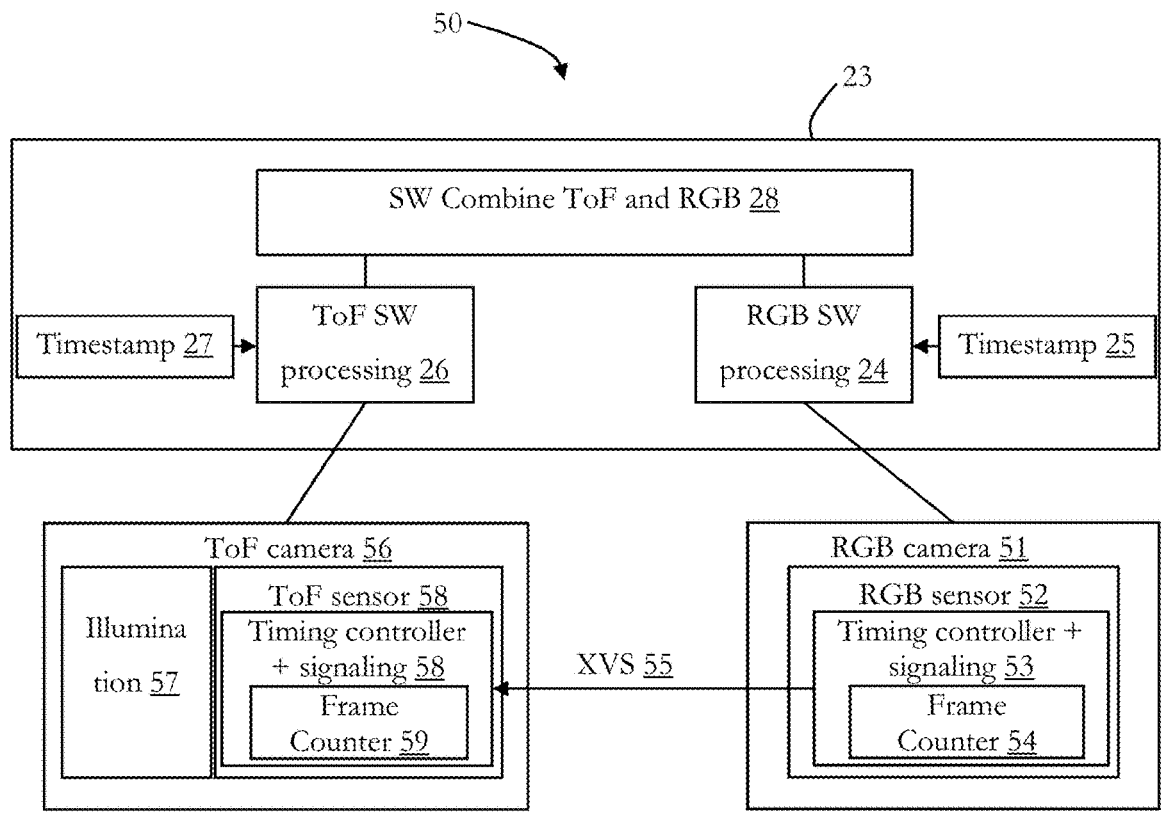
FIG. 5 shows a block diagram of a system according to the present disclosure.

Before a detailed description of the embodiments under reference of FIG. 5 is given, general explanations are made.

As mentioned in the outset, it is generally desirable to image a scene with two (or more) image sensors.

However, having a complex communication system between the two or more image sensors causes manufacturing costs in some instances, whereas it is generally desirable to reduce costs.

Moreover, it has been recognized that known systems lead to an erroneous association of the imaging frames of the two (or more) image sensors in some instances (as discussed with respect to FIGS. 1 to 4), and it is desirable to correctly associate the imaging frames with each other.

The erroneous association of the imaging frames may be caused, for example, because frame counters included in the two (or more) image sensors may not be synchronized and/or because a timestamp applied to the frames are not synchronized or may be deteriorated due to different processing delays (or unknown latency) of the two (or more) image sensors or the software processing the imaging frames, respectively.

Therefore, some embodiments pertain to a master image sensor configured to communicate with a slave image sensor via an exposure time voltage line, wherein the exposure time voltage line is connected to a terminal of the master image sensor, the master image sensor including master circuitry, configured to: transmit to the slave image sensor, via the exposure time voltage line, an exposure time voltage signal being indicative of an exposure time for the master image sensor; and transmit to the slave image sensor, via the exposure time voltage line, an auxiliary information voltage signal being indicative of auxiliary information for adjusting at least one imaging capture parameter of the slave imaging sensor.

The master image sensor may be any known type of image sensor, such as a color sensor (e.g. visible and non-visible colors, e.g. from the infrared spectrum or ultraviolet spectrum, and the like). The master image sensor may further be a time-of-flight (ToF) image sensor for generating a depth image or performing a distance measurement (or multiple distance measurements with multiple imaging elements, e.g. pixels).

The master image sensor may be based on known technologies, such as CMOS (complementary metal oxide semiconductor), CCD (charge coupled device), SPAD (single photon avalanche diode), CAPD (current assisted photonic demodulator) and may include a single imaging element or multiple imaging elements arranged in an array, and the like (e.g. pixels).

The master image sensor may fulfill a master function based on the known principle of master and slave communication, i.e. being authoritative over one or multiple (at least two) slave image sensors.

The master image sensor may be configured to communicate with a slave image sensor (or as discussed with multiple slave image sensors).

The slave image sensor may be any type of image sensor (as already discussed for the master image sensor). It may be an image sensor of a same type as the master image sensor or of a different type.

For example, the master image sensor may be a time-of-flight image sensor, whereas the slave image sensor may be a color image sensor. Furthermore, the slave image sensor may be a time-of-flight image sensor and the master image sensor may be a color image sensor. Moreover, the slave image sensor and the master image sensor may both be color image sensors or both be ToF image sensors.

It should be noted that the present disclosure is not limited to ToF and color image sensors and may be applied to any image sensor.

Moreover, as the master image sensor, the slave image sensor may be based on CMOS, CCD, SPAD, CAPD, and the like and may include a single imaging element (e.g. a pixel) or multiple imaging elements arranged in an array, as it is generally known. However, the slave image sensor is not limited to be based on the same imaging technology as the master image sensor. For example, the slave image sensor may be based on CCD technology and the master image sensor may be based on CMOS technology, and the like.

The exposure time voltage line may be a (single) wire, line, and the like, which is configured to transmit an electric signal, such as a voltage, or at which the electric signal can be applied.

The exposure time voltage line may be connected to a terminal of the master image sensor.

Connected may, in this context, refer to the establishment of an electric connection, as it is generally known, for example with a line on a printed circuit board, a wiring within a semiconductor, a cable, and the like. The connection may be established by soldering, printing, laminating, and the like.

The terminal of the master image sensor may refer to means in order to output the electric signal (as discussed), such as a pin, and the like, as it is generally known.

Moreover, in some embodiments, the exposure time voltage line may be connected to exactly one terminal of the master image sensor, whereas, in other embodiments, the exposure time voltage line may be connected to a plurality (i.e. more than one) of terminals of the master image sensor.

In some embodiments, the master circuitry refers to any kind of circuitry included in the master image sensor, such as a CPU (central processing unit), GPU (graphic processing unit), FPGA (field programmable gate array), one or multiple integrated circuits, and the like. Also a combination of the aforementioned devices may be envisaged.

The master circuitry is, in some embodiments, configured to transmit to the slave image sensor, via the exposure time voltage line, an exposure time voltage signal being indicative of an exposure time for the master image sensor.

Transmit may refer to any kind of a sending of a signal from the master image sensor to the slave image sensor, such as an application of a voltage (as discussed) or an electric communication in general, for example by the exposure time voltage signal.

The exposure time voltage signal may be indicative of an exposure time for the master image sensor.

The exposure time voltage signal may be any kind of (electric) signal, which is transmissible through the exposure time voltage line and it may be representative of a voltage or a voltage characteristic, and the like.

The exposure time may be representative of a time (interval), in which light is acquired. It may therefore refer to a time (interval), in which a shutter is opened, a time (interval), in which a photoelectric signal is generated, a time (interval), in which the photoelectric signal is read out, a time (interval), in which the master image sensor is driven (e.g. by an external control), a combination of aforementioned times (or time intervals), and the like.

Moreover, the master circuitry may be configured to transmit to the slave image sensor, via the exposure time voltage line, an auxiliary information voltage signal being indicative of auxiliary information for adjusting at least one imaging capture parameter of the slave imaging sensor.

The auxiliary information voltage signal may be, as the exposure time voltage signal, any kind of (electric) signal transmissible through the exposure time voltage line.

The auxiliary information may be any information concerning an imaging process of the master image sensor, such as an acquisition time, a frame rate, a frame number, a modulation frequency (e.g. how often a signal is read out), illumination time, illumination frequency, and the like.

An imaging capture parameter may refer to a frame rate, a capturing distance, an exposure time, an illumination time, an illumination frequency and the like.

Thus, an imaging capture parameter may be adjusted (e.g. adapted) based on the auxiliary information.

For instance, if the master image sensor and the slave image sensor have both a predetermined frame rate, in which imaging frames are generated, which may be twenty frames per second for the master image sensor and forty frames per second for the slave image sensor, the respective imaging frames may need to be associated.

However, since the slave image sensor may generate the double amount of frames than the master image sensor, the adjustment may be that every second frame of the slave image sensor is left out, not taken into account, and the like.

Moreover, further imaging capture parameters may be adjusted based on, e.g. the frame rate of the master image sensor. For example, in embodiments, in which the slave image sensor is adapted to acquire distance information (e.g. a time-of-flight sensor), a capturing distance (i.e. a maximum distance which may be determined in one distance measurement) may be adjusted, since the capturing distance may be based on the frame rate, the modulation frequency (which may also be associated with the frame rate), and the like.

Hence, in some embodiments, an imaging capture parameter which may be different from a parameter indicated by the auxiliary information may be adapted.

For example, a frame rate of the slave image sensor may be adapted based on the modulation frequency of the master image sensor, without limiting the present disclosure in that regard.

In some embodiments, the exposure time voltage line is an external vertical signal line.

Generally, external vertical signal (XVS) lines are known for transmitting an exposure time signal, for example, if a CMOS image sensor is used as a master image sensor.

The exposure time signal may correspond, in such embodiments, to the exposure time voltage signal, and the exposure time signal of the XVS line may be adapted, such that the auxiliary information, as discussed herein, may be transmitted.

In some embodiments, the at least one imaging capture parameter is at least one of a frame rate, a capturing distance and an exposure time, as discussed herein.

In some embodiments, the exposure time voltage signal indicates the exposure time by an exposure time voltage signal pulse width, and the auxiliary information voltage signal indicates the auxiliary information by at least one of an auxiliary information voltage signal level, an auxiliary information voltage signal pulse width and an auxiliary information voltage signal pattern.

For example, the exposure time voltage signal may be a direct-current voltage signal, which may have an on state (voltage roughly at a predetermined level, i.e. a logical high or one) and an off state (i.e. a logical low or zero). Then, in some embodiments, the exposure time pulse width refers to the time, in which the exposure time voltage signal is at a logical high.

For example, the exposure time voltage signal may correspond to the exposure time, since the exposure time voltage signal may be as long as the exposure time, or it may correspond to the exposure time plus, minus, divided by or times a predetermined value, which may depend on a calibration, or the like.

The auxiliary information voltage signal level may refer to a voltage level being different from the logical high or low. For example, if the logical high corresponds to one volt, but two volts are applied at the exposure time voltage line, predetermined information are defined for the voltage level of two volts.

For example, two volts may indicate a frame rate of 20 frames per second, and the like, without limiting the present disclosure in that regard.

Thus, for each voltage level, predetermined auxiliary information may be defined.

Similar to that, the auxiliary information voltage signal pulse width (wherein the pulse width may be defined the same as for the exposure time voltage signal pulse width), may include auxiliary information.

In such embodiments, it needs to be distinguished between the exposure time voltage signal pulse and the auxiliary information voltage signal pulse. For example, a predetermined ordering of the respective pulses may be applied, which may be programmed into any of the image sensors or a host circuitry, and the like.

It should be noted that the present disclosure is not limited to the transmission of the exposure time voltage signal and the auxiliary information voltage signal in that order as it is described herein. The ordering may be exchanged or the two signals may overlap, i.e. transmitted at roughly the same time.

For example, the auxiliary information may be indicated by an auxiliary information voltage signal pattern.

The auxiliary information voltage signal pattern (short: pattern) may be a sequence of logical highs and logical lows. Moreover, the respective elements of the sequence (i.e. single highs and lows) may further have a pulse width including further information.

In that way, a coded message may be transmitted from the master image sensor to the slave image sensor being representative of both the auxiliary information and the exposure time.

Moreover, the exposure time may be represented by the auxiliary information, as well.

For example, if a pattern is applied, the exposure time may be indicated by a time interval starting from the first pulse of the pattern and ending at the last pulse of the pattern, or it may be a summed up pulse length of the pulses (or dips, i.e. when the signal is a logical low) of the pattern.

In some embodiments, the master circuitry is further configured to receive, from the slave image sensor, the at least one imaging capture parameter, such that the circuitry is further configured to adapt at least one of the exposure time voltage signal and the auxiliary information voltage signal according to the at least one imaging capture parameter received from the slave image sensor.

The reception may be conducted via the exposure time voltage line, but an imaging capture parameter reception line may be envisaged, as well.

For example, if the master image sensor has an operating frame rate of twenty frames per second, but the slave image sensor has an operating frame rate of ten frames per second, the master image sensor is configured to receive the operating frame rate of the slave image sensor (or any other imaging capture parameter) and adapt the auxiliary information voltage signal, such that the slave image sensor speeds up its acquisition and also has an operating frame rate of twenty frames per second, without limiting the present disclosure in that regard.

Any other imaging capture parameter may be received and any of the exposure time voltage signal and the auxiliary information voltage signal may be adapted in response to the reception. Moreover, the present disclosure is not limiting with respect to the frame rates and the discussed principle may be applied to any frame rate of the master and the slave image sensor.

In some embodiments, the master image sensor adapts its imaging capture parameter (e.g. the frame rate) to the received imaging capture parameter of the slave image sensor, for example, if the slave image sensor is already at its maximum frame rate. In such a case, the master image sensor may slow down its acquisition to the maximum frame rate of the slave image sensor.

Some embodiments pertain to a slave image sensor configured to communicate with a master image sensor via an exposure time voltage line, wherein the exposure time voltage line is connected to a terminal of the master image sensor, including slave circuitry configured to: receive from the master image sensor, via the exposure time voltage line, an exposure time voltage signal being indicative of an exposure time of the master image sensor; and receive from the master image sensor, via the exposure time voltage line, an auxiliary information voltage signal being indicative of auxiliary information for adjusting at least one imaging capture parameter of the slave image sensor, as discussed herein.

The slave circuitry may be, similarly as discussed with respect to the master circuitry, any kind of circuitry included in the slave image sensor, such as a CPU (central processing unit), GPU (graphic processing unit), FPGA (field programmable gate array), one or multiple integrated circuits, and the like. Also a combination of the aforementioned devices may be envisaged.

In some embodiments, the exposure time voltage line is an external vertical signal line, as discussed herein. In some embodiments, the at least one imaging capture parameter is at least one of a frame rate, a capturing distance and an exposure time, as discussed herein. In some embodiments, the exposure time voltage signal indicates the exposure time by an exposure time voltage signal pulse width and the auxiliary information voltage signal indicates the auxiliary information by at least one of an auxiliary information voltage signal level, an auxiliary information voltage signal pulse width and an auxiliary information voltage signal pattern, as discussed herein. In some embodiments, the slave circuitry is further configured to transmit, to the master image sensor, the imaging capture parameter, as discussed herein.

Some embodiments pertain to an imaging system including: an exposure time voltage line; a master image sensor being connected to the exposure time voltage signal via a terminal of the master image sensor, the master image sensor being configured to communicate with a slave image sensor via the exposure time voltage line; the slave image sensor; and host circuitry configured to: generate an exposure time voltage signal being indicative of an exposure time of the master image sensor; generate an auxiliary information voltage signal being indicative of auxiliary information for adjusting at least one imaging capture parameter of the slave image sensor; transmit, via the exposure time signal line, the exposure time voltage signal and the auxiliary information voltage signal.

The host circuitry may be any kind of circuitry included in the imaging system, such as a CPU (central processing unit), GPU (graphic processing unit), FPGA (field programmable gate array), one or multiple integrated circuits, and the like. Also, a combination of the aforementioned devices may be envisaged and implemented in some embodiments. Moreover, the host circuitry may be the master image sensor, the slave image sensor, distributed in the respective image sensor, partly distributed in one sensor, and the like.

For example, the host circuitry may be included in the master image sensor, thereby it may be added to or communicate with the master circuitry. However, it may also be completely excluded from any of the master and the slave image sensor.

The host circuitry is, in some embodiments, configured to generate the exposure time voltage signal and the auxiliary information voltage signal, which is transmitted through the exposure time voltage line.

It should, however, be noted that the generation of the respective signals is not limited to the generation of an exactly determinable voltage level, and the like. The generation may also pertain to a generation of a (high or low level) signal, such that the exposure time voltage signal and/or the auxiliary information voltage signal may be generated, e.g. in the master circuitry.

In some embodiments, the host circuitry is further configured to generate master imaging frames for the master image sensor and slave imaging frames for the slave image sensor; and merge the master imaging frames and the slave imaging frames based on the exposure time voltage signal and the auxiliary information voltage signal.

An imaging frame may refer to the generation of imaging information within a predetermined time window, as it is generally known.

An imaging frame for generating imaging information for an acquisition window of the slave image sensor will be referred to as slave imaging frame and an imaging frame for generating imaging information for the master image sensor will be referred to as master imaging frame.

The host circuitry may be further configured to merge the master imaging frames and the slave imaging frames based on the exposure time voltage signal and the auxiliary information voltage signal.

For example, it may be desirable to overlap a master imaging frame with a slave image frame, for example, if the slave image sensor is a ToF sensor and the master image sensor is a color sensor, depth information may be merged with color information.

Thus, since the slave image sensor may receive the exposure time voltage signal and the auxiliary information voltage signal, and in response to that, the slave imaging frame acquisition may be controlled, the host circuitry may be configured to associate a slave imaging frame with a master imaging frame acquired at roughly the same point of time, whereby the master and the slave imaging frame may be merged.

In some embodiments, the exposure time signal line is an external vertical signal line, as discussed herein. In some embodiments, the at least one imaging capture parameter is at least one of a frame rate, a capturing distance and an exposure time, as discussed herein. In some embodiments, the exposure time voltage signal indicates the exposure time by an exposure time voltage signal pulse width, and wherein the auxiliary information voltage signal indicates auxiliary information by at least one of an auxiliary information voltage signal level, an auxiliary information voltage signal pulse width and an auxiliary information voltage signal pattern, as discussed herein.

In some embodiments, the host circuitry is further configured to transmit, from the slave image sensor to the master image sensor, the imaging capture parameter, such that the host circuitry is further configured to adapt at least one of the exposure time voltage signal and the auxiliary information voltage signal according to the at least one imaging capture parameter received from the slave image sensor, as discussed herein.

In such embodiments, the host circuitry may be partly included in the slave image sensor, such that it is (at least partly) equivalent to or communicates with the slave circuitry.

Some embodiments pertain to an information processing method, including: generating an exposure time voltage signal being indicative of an exposure time of a master image sensor; generating an auxiliary information voltage signal being indicative of auxiliary information for adjusting at least one imaging capture parameter of a slave image sensor; transmitting the exposure time voltage signal and the auxiliary information voltage signal, as discussed herein.

The information processing method may be performed by the host circuitry, as discussed above, without limiting the present disclosure in that regard. It may also be performed by one or multiple processors, computers, servers, combinations thereof, and the like.

In some embodiments, the information processing method further includes: generating master imaging frames and slave imaging frames; and merging the master imaging frames and the slave imaging frames based on the exposure time voltage signal and the auxiliary information voltage signal, as discussed herein. In some embodiments, the exposure time voltage signal indicates the exposure time by an exposure time voltage signal pulse width, and wherein the auxiliary information voltage signal indicates the auxiliary information by at least one of auxiliary information voltage signal level, auxiliary information voltage signal pulse width and auxiliary information voltage signal pattern, as discussed herein. In some embodiments, the information processing method further includes transmitting the imaging capture parameter from the slave image sensor to the master image sensor, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 1:
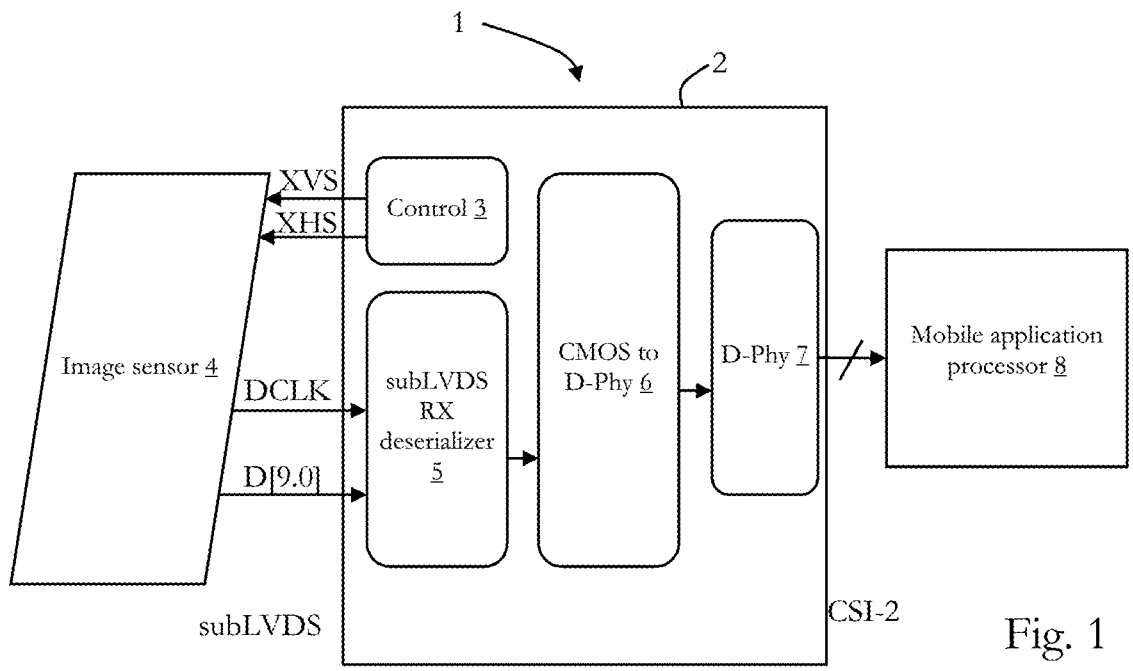
FIG. 1 depicts a block diagram of a system for synchronizing two image sensors, as it is generally known.

In FIG. 1, there is depicted, in a block diagram, a system 1 for synchronizing two image sensors, as it is generally known.

The system 1 includes a conversion unit 2 for controlling and converting imaging signals.

The conversion unit 2 includes a control 3, a subLVDS RX deserializer 5, a CMOS to D-Phy unit 6, and a D-Phy unit 7.

The control 3 sends and XVS (external vertical signal line) signal and XHS (external horizontal signal line) signal for driving vertical pixels and horizontal pixels, respectively, to an image sensor 4 included in the system 1.

In response to the reception of the XVS and XHS signal, the image sensor sends a DCLK signal, which is a clock signal, and a D[9.0] signal including imaging information acquired by the image sensor 4, to the subLVDS RX deserializer 5.

The DCLK signal and the D[9.0] signal are sent via a subLVDS signal line, wherein LVDS stands for low voltage differential signaling, i.e. a communication protocol, subLVDS having a lower voltage than LVDS.

The signals sent via the subLVDS signal line are processed in the subLVDS RX deserializer 5 and transmisted to the CMOS to D-Phy unit 6, which converts the signals originating from the image sensor 4 to a D-Phy signal (which is generally known).

The D-Phy unit 7 transmits the D-Phy signal wirelessly to a mobile application processor 8 (in this embodiment a drone with a camera) included in the system 2, such that an image can be taken roughly synchronously together with the image sensor 4.

Figure 2:
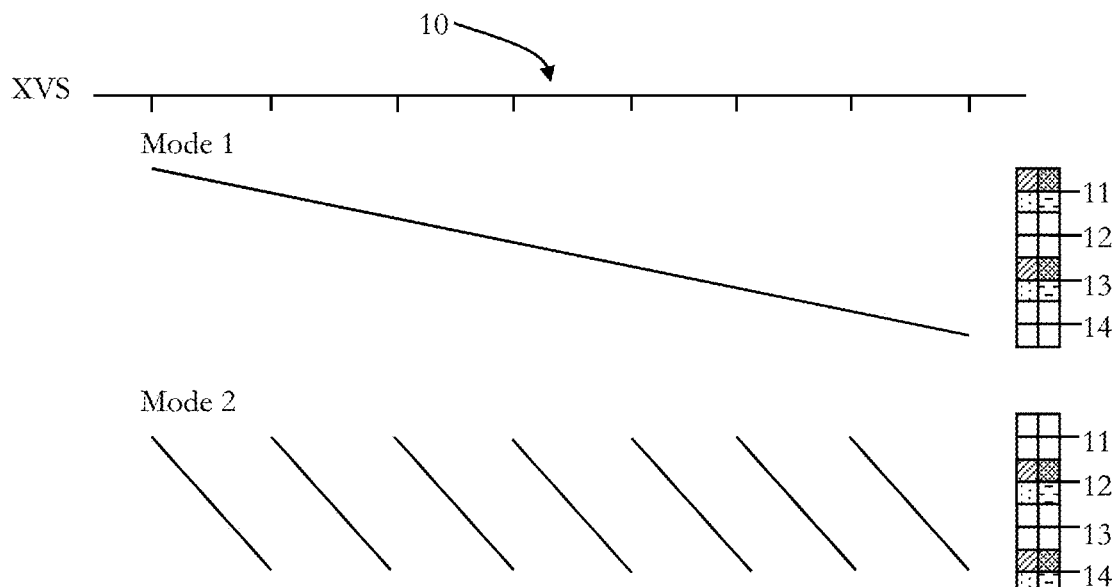
FIG. 2 shows an exemplary reading mode of a signal of an image sensor.

FIG. 2 shows an exemplary reading mode 10 of a signal of an image sensor, such as the image sensor 4 of FIG. 1, in which the image sensor 4 can be driven through the XVS line.

In this embodiment, the pixel signals are read in two reading modes, modes 1 and 2. For example, when the mode 1 is a monitoring mode, an operation is performed at 30 fps (frames per second). When the mode 2 is an AF (autofocus) mode, an operation is performed at 240 fps. In this way, the reading of the pixel signal from the pixel may be controlled to be performed at a frame rate of the mode corresponding to the pixel.

At this time, the vertical signal lines 11 and 13 are allocated to the mode 1, and the vertical signal lines 12 and 14 are allocated to the mode 2. Therefore, even when the pixel signals are read in the two reading modes having different frame rates from each other, since the vertical signal lines 11 to 14 are distributed to the respective reading modes, the pixels and the vertical signal lines 11 to 14 are not overlapped with each other in the reading of the pixel signals in the respective reading modes. Therefore, the image sensor 4 can more easily realize the reading in the two reading modes without affecting the image quality.

Figure 3:
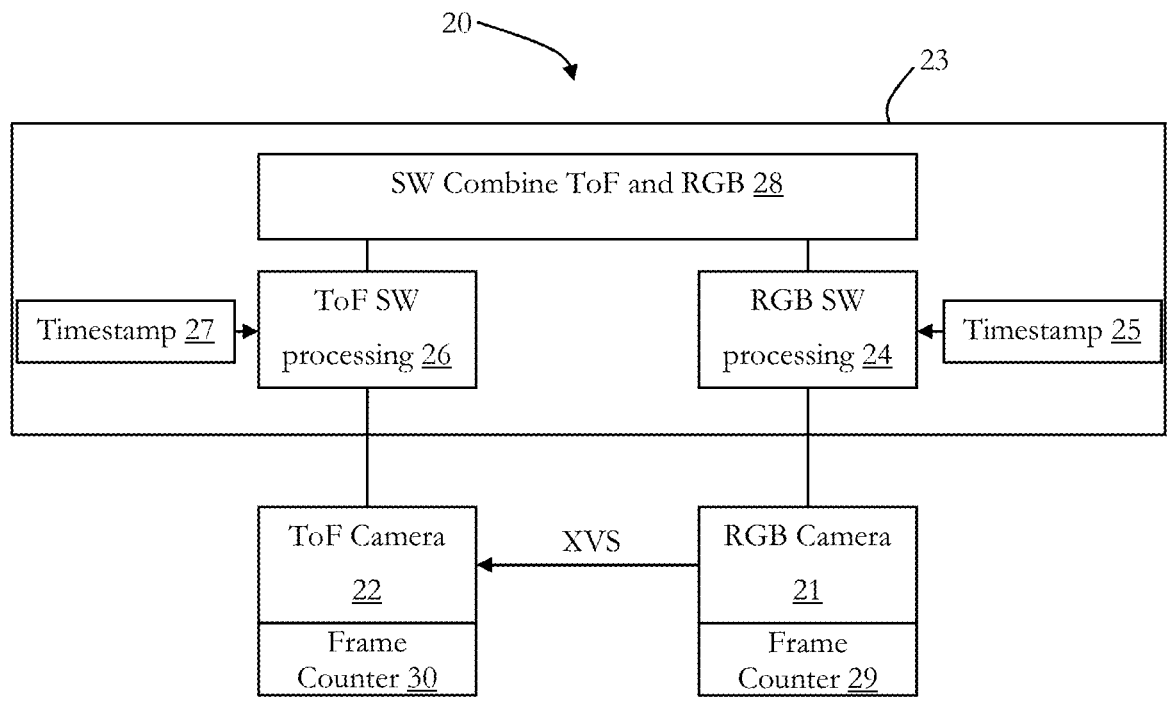
FIG. 3 depicts a block diagram a system 20 for synchronizing an RGB camera with a ToF camera.

With the reading mode 10 described with respect to FIG. 2, two cameras or image sensors can be controlled with one imaging signal through the XVS line, which is now described with respect to FIG. 3, wherein it is depicted, in a block diagram, a system 20 for synchronizing an RGB camera 21 (i.e. a color camera) with a ToF (time-of-flight) camera 22.

The system 20 further includes a processor 23 for processing the respective imaging signals of the RGB camera 21 and the ToF camera 22 and for synchronizing the respective imaging signals.

The processor 23 includes, thus, a software stack 24 for controlling the RGB camera and for processing the RGB imaging signal, for which, moreover a software stack for applying a timestamp 25 is included.

Moreover, the processor includes a software stack 26 for controlling the ToF camera and for processing the ToF imaging signal, and a software stack for applying a timestamp 27.

For combining the ToF and RGB imaging information, the processor 23 includes a further software stack 28.

The processor 23 sends an imaging signal to the RGB camera 21, which further includes a frame counter 29 for counting imaging frames, which are generated in an imaging process.

In response to the imaging signal, which the RGB camera receives from the processor 23, the RGB camera generates an XVS signal, which is transmitted to the ToF camera 22. The XVS signal indicates the reception of the imaging signal of the RGB camera 21, such that the ToF camera 22 (including a frame counter 30) also starts an imaging process.

During the respective imaging processes of the RGB camera 21 and the ToF camera 22, imaging frames are generated for each of the RGB camera 21 and the ToF camera 22, as it is generally known and described herein.

The imaging frames are counted by the respective frame counters 29 and 30 and transmitted, in the case of the RGB camera 21, to the software stack 24, in which a timestamp 25 is applied to each imaging frame. In the case of the ToF camera 22, the imaging frames are transmitted to the software stack 26, in which a timestamp 27 is applied to each imaging frame.

The processed imaging frames of the software stacks 24 and 26 are then transmitted to the software stack 28, which combines the ToF and RGB imaging frames.

However, in such systems as the system 20, errors can occur with respect to combining the right frames with each other, because the frame counters are free running and are not synchronized and the timestamps 25 and 27 are added by a software, such that an offset between the two timestamps 25 and 27 occurs and the offset is variable within each acquisition.

Figure 4:
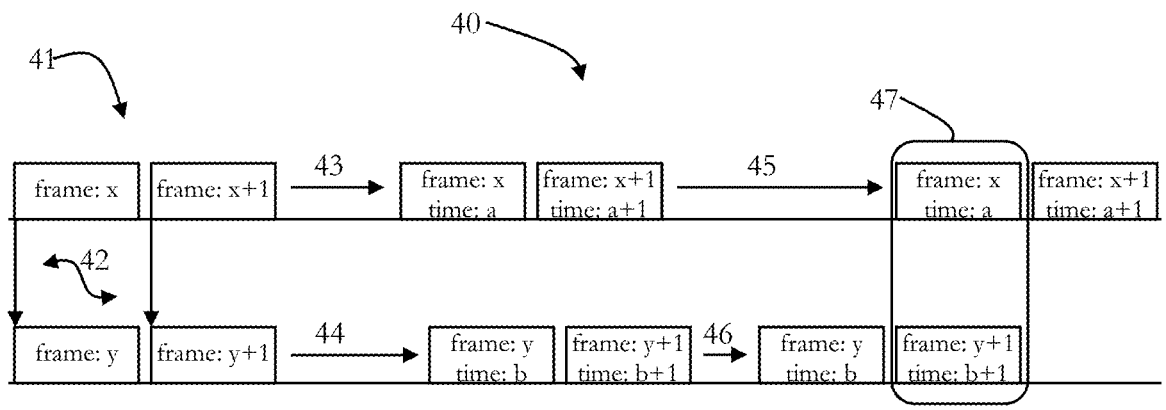
FIG. 4 depicts a block diagram of a method as performed by the system of FIG. 3.

This is further described with respect to FIG. 4.

FIG. 4 depicts, in a block diagram, a method 40 as performed by the system 20 of FIG. 3.

In 41, the RGB camera 21 starts an image acquisition. Thereby, imaging frames (x and x+1) are generated.

Thus, in 41, since the RGB camera 21 and the ToF camera 22 are coupled via the XVS line, the ToF camera starts an image acquisition and thereby generates the imaging frames y and y+1.

In 43, the RGB imaging frames are processed and a timestamp is applied, i.e. frame x is associated with the time a and frame x+1 is associated with the time a+1.

In 44, the ToF imaging frames are processed and a timestamp is applied, i.e. frame y is associated with time b and frame y+1 is associated with time b+1.

It should be noted that the adding of the timestamps of 43 and 44 is performed with different delays, such that the frames x, y and y+1, x+1, which were generated synchronously in 41 and 42, have become asynchronous.

In 45 and 46, the frames are transmitted to the software stack 28, in which different delays are involved, such that, in 47, frame x is combined with frame y+1 instead of y.

Returning to FIG. 5, there is shown a block diagram of a system 50 according to the present disclosure.

The system 50 includes the processor 23, as it is already described with respect to FIG. 3, and therefore, its description is omitted.

Moreover, the system 50 includes an RGB camera 51 having an RGB sensor 52 (i.e. a master image sensor, as discussed herein), wherein the RGB sensor further includes a timing controller and signaling unit 53, further including a frame counter 54.

The RGB camera 51 is configured to communicate, via an XVS line 55 (i.e. an exposure time voltage line), with a ToF camera 56.

The ToF camera 56 includes an illumination 57 for illuminating a scene (e.g. an object) and a ToF sensor 58 (i.e. a slave image sensor). The ToF sensor 58 further includes a timing controller and signaling unit 58 having a frame counter 59.

The timing controller and signaling unit 53 of the RGB sensor 52 is configured to adapt the exposure time voltage signal, such that auxiliary information is sent to the ToF sensor 58.

The ToF sensor 58 also includes a timing controller and signaling unit 58 similar to the RGB sensor 52, such that the ToF sensor 58 can be adapted to work as a master image sensor, as well.

Figure 6:
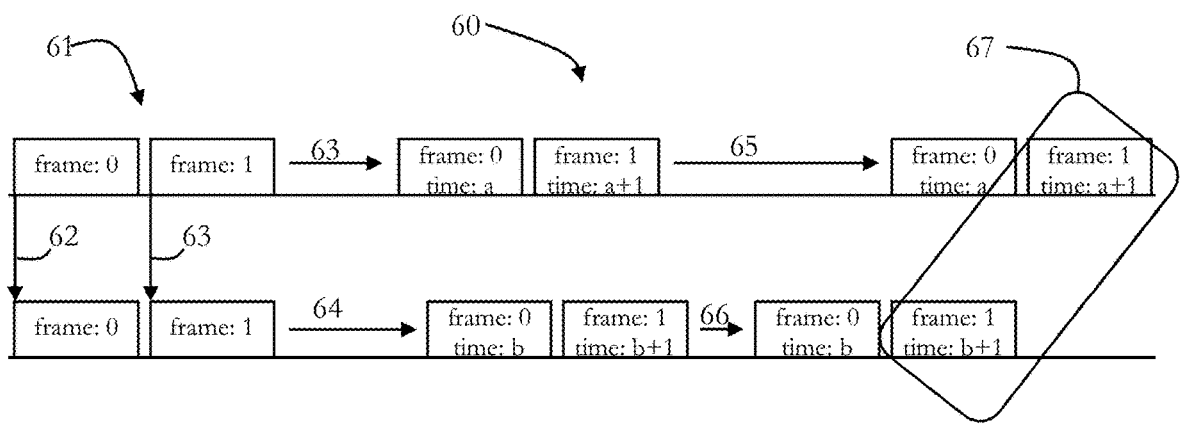
FIG. 6 shows, in a block diagram, an embodiment of a method of an adaption of an exposure time voltage signal.

An embodiment of a method 60 of the adaption of the exposure time voltage signal is now described with respect to FIG. 6.

The method 60, as depicted in a block diagram, includes, in 61 the start of an acquisition of the RGB camera 51, such that frames zero and one are generated.

In 62, in response to the generation of frame x, the timing controller and signaling unit 53 generates auxiliary information, such that the exposure time voltage signal is above a predetermined threshold, such that the auxiliary information is distinguishable from the exposure time. Thus, the frame counter 59 of the ToF sensor 58 is reset and frame zero of the ToF sensor 58 is generated.

In 63, the exposure time voltage signal is adapted to have a length roughly equal to the predetermined threshold, thus indicating the exposure time, and thereby inducing the ToF sensor 58 to generate its frame one.

In 63 and 64 timestamps are applied to the respective frames, i.e. frame zero and one of the RGB sensor are associated with the times a and a+1, respectively, and frame zero and one of the ToF sensor are associated with the times b and b+1, respectively (again, with different delays in 63 and 64).

In 65 and 66, the frames of the respective image sensors 52 and 58 are combined, which is based on a processing of the respective imaging frames with different delays.

However, in 67 frame one of the RGB sensor is associated with frame 1 of the ToF sensor, since in 62, the frames counters are reset sufficiently, such that the influence of the different delays can be neglected. In addition, frame zero of the RGB sensor and frame zero of the ToF sensor are associated correctly, which is, for the sake of simplicity, not depicted in FIG. 6.

Figure 7:
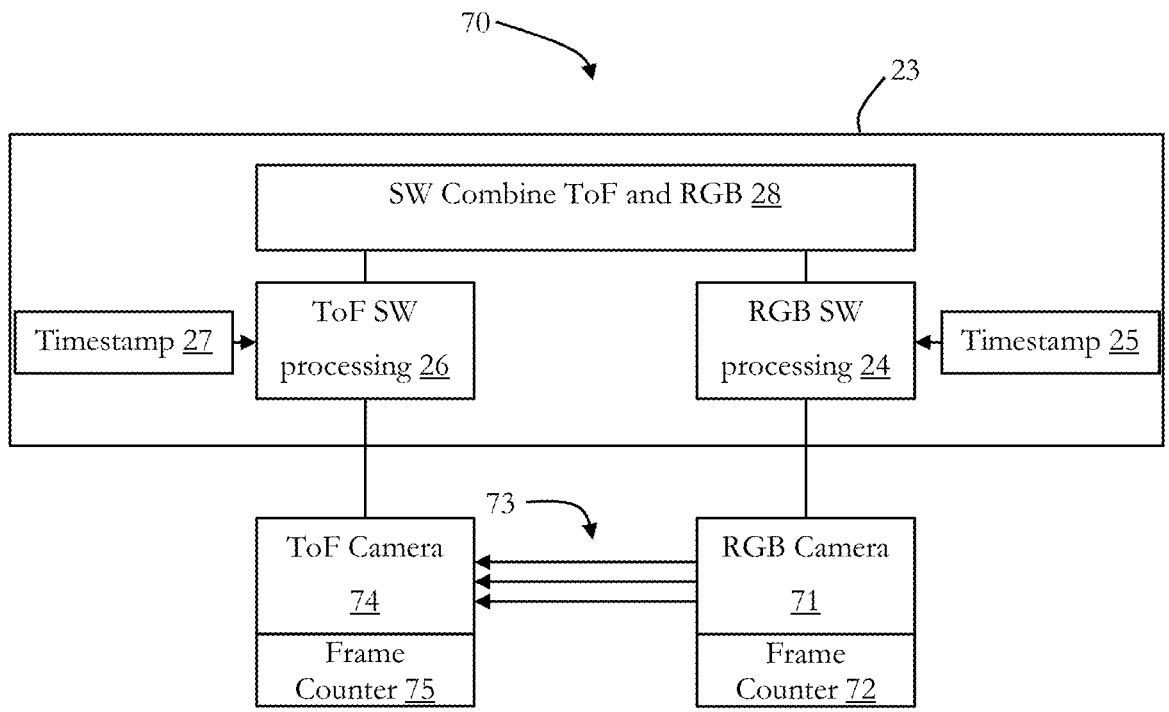
FIG. 7 depicts a block diagram of a system according to an embodiment of the present disclosure.

FIG. 7 depicts a block diagram of a system 70 according to an embodiment of the present disclosure.

The system 70 includes the processor 23 as described with respect to FIG. 3, such that a repetitive description is omitted.

The system 70 further includes a RGB camera 71 including a master image sensor (not depicted) and a frame counter 72. Moreover, the system 70 includes a ToF camera 73 including a slave image sensor (not depicted) and a frame counter 74.

The RGB camera 71 and the ToF camera 74 are configured to communicate via the exposure time voltage line. In this embodiment, the exposure time voltage line includes three signal lines (however, any number of signal lines may be envisaged), such that a messaging protocol can be established between the master image sensor and the slave image sensor for the transmission of auxiliary information. In this embodiment, a frame rate message is sent from the slave image sensor to the master image sensor, such that the master image sensor waits for the slave image sensor until the slave image sensor's current frame acquisition is finished.

Moreover, the exposure time is additionally included in the auxiliary information, which is adapted dynamically in the case that the RGB camera is in an automatic exposure mode, such that the exposure time changes with every generated imaging frame.

Moreover, a depth histogram is transmitted from the slave image sensor (ToF sensor) to the RGB camera, such that the RGB camera can adapt its exposure time.

Figure 8:
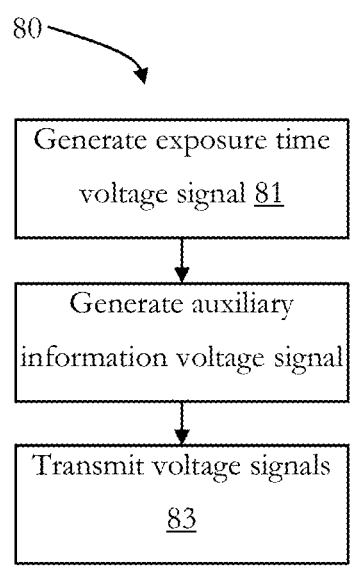
FIG. 8 depicts a block diagram of a method according to the present disclosure.

FIG. 8 depicts a block diagram of a method 80 according to the present disclosure.

In 81, the exposure time voltage signal is generated, as discussed herein.

In 82, the auxiliary information voltage signal is generated, as discussed herein.

In 83, the exposure time voltage signal and the auxiliary information voltage signal are transmitted, as discussed herein.

Figure 9:
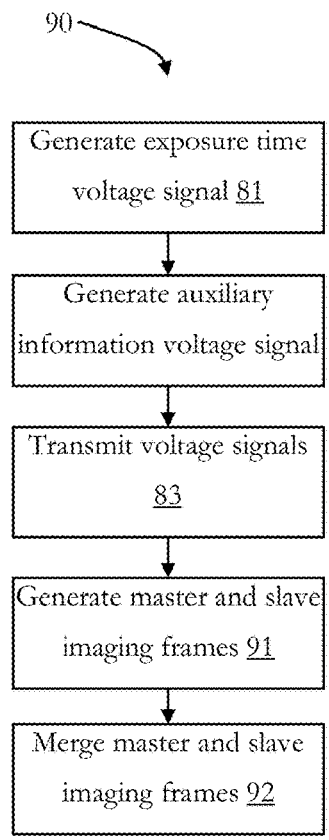
FIG. 9 depicts a block diagram of a further method according to the present disclosure.

FIG. 9 depicts a block diagram of a method 90 according to the present disclosure.

91 and 92 are appended to the method 80, such that the repetitive description of 81 to 83 are omitted.

In 91, master imaging frames and slave imaging frames are generated, as discussed herein.

In 92, the master imaging frames and the slave imaging frames are generated, as discussed herein.

Figure 10:
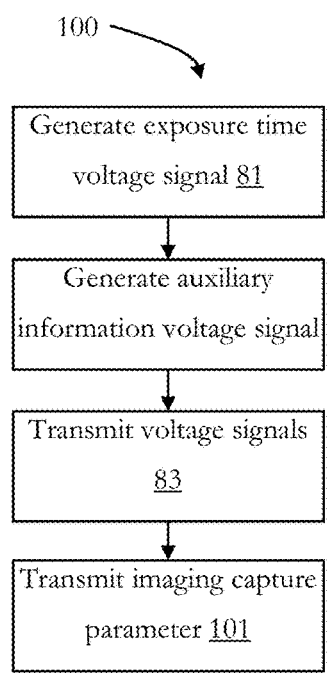
FIG. 10 depicts a block diagram of a further method according to the present disclosure.

FIG. 10 depicts a block diagram of a method 100 according to the present disclosure. 101 is appended to the method 80, such that the repetitive description of 81 to 83 are omitted.

In 101, an imaging capture parameter is transmitted from the slave image sensor to the master image sensor, as discussed herein.

It should be recognized that the embodiments describe methods with an exemplary ordering of method steps. The specific ordering of method steps is however given for illustrative purposes only and should not be construed as binding. For example the ordering of 81 and 82 in the embodiment of FIG. 8 may be exchanged. Also, the ordering of 81, 82 and 101 in the embodiment of FIG. 10 may be exchanged. Further, also the ordering of 83 and 101 in the embodiment of FIG. 10 may be exchanged. Other changes of the ordering of method steps may be apparent to the skilled person.

Please note that the division of the processor 23 into units 24 to 28 is only made for illustration purposes and that the present disclosure is not limited to any specific division of functions in specific units. For instance, the processor 23 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A master image sensor configured to communicate with a slave image sensor via an exposure time voltage line, wherein the exposure time voltage line is connected to a terminal of the master image sensor, the master image sensor comprising master circuitry, configured to:
transmit to the slave image sensor, via the exposure time voltage line, an exposure time voltage signal being indicative of an exposure time for the master image sensor; and
transmit to the slave image sensor, via the exposure time voltage line, an auxiliary information voltage signal being indicative of auxiliary information for adjusting at least one imaging capture parameter of the slave imaging sensor.

(2) The master image sensor of (1), wherein the exposure time voltage line is an external vertical signal line.

(3) The master image sensor of anyone of (1) and (2), wherein the at least one imaging capture parameter is at least one of a frame rate, a capturing distance and an exposure time.

(4) The master image sensor of anyone of (1) to (3), wherein the exposure time voltage signal indicates the exposure time by an exposure time voltage signal pulse width, and wherein the auxiliary information voltage signal indicates the auxiliary information by at least one of an auxiliary information voltage signal level, an auxiliary information voltage signal pulse width and an auxiliary information voltage signal pattern.

(5) The master image sensor of anyone of (1) to (4), wherein the master circuitry is further configured to receive, from the slave image sensor, the at least one imaging capture parameter, such that the circuitry is further configured to adapt at least one of the exposure time voltage signal and the auxiliary information voltage signal according to the at least one imaging capture parameter received from the slave image sensor.

(6) A slave image sensor configured to communicate with a master image sensor via an exposure time voltage line, wherein the exposure time voltage line is connected to a terminal of the master image sensor, comprising slave circuitry configured to:
receive from the master image sensor, via the exposure time voltage line, an exposure time voltage signal being indicative of an exposure time of the master image sensor; and
receive from the master image sensor, via the exposure time voltage line, an auxiliary information voltage signal being indicative of auxiliary information for adjusting at least one imaging capture parameter of the slave image sensor.

(7) The slave image sensor of (6), wherein the exposure time voltage line is an external vertical signal line.

(8) The slave image sensor of anyone of (6) and (7), wherein the at least one imaging capture parameter is at least one of a frame rate, a capturing distance and an exposure time.

(9) The slave image sensor of anyone of (6) to (8), wherein the exposure time voltage signal indicates the exposure time by an exposure time voltage signal pulse width and the auxiliary information voltage signal indicates the auxiliary information by at least one of an auxiliary information voltage signal level, an auxiliary information voltage signal pulse width and an auxiliary information voltage signal pattern.

(10) The slave image sensor of anyone of (6) to (9), wherein the slave circuitry is further configured to transmit, to the master image sensor, the imaging capture parameter.

(11) An imaging system comprising:
an exposure time voltage line;
a master image sensor being connected to the exposure time voltage signal via a terminal of the master image sensor, the master image sensor being configured to communicate with a slave image sensor via the exposure time voltage line;
the slave image sensor; and
host circuitry configured to:
generate an exposure time voltage signal being indicative of an exposure time of the master image sensor;
generate an auxiliary information voltage signal being indicative of auxiliary information for adjusting at least one imaging capture parameter of the slave image sensor;

transmit, via the exposure time signal line, the exposure time voltage signal and the auxiliary information voltage signal.

(12) The imaging system of (11), wherein the host circuitry is further configured to:
generate master imaging frames for the master image sensor and slave imaging frames for the slave image sensor; and
merge the master imaging frames and the slave imaging frames based on the exposure time voltage signal and the auxiliary information voltage signal.

(13) The imaging system of anyone of (11) and (12), wherein the exposure time signal line is an external vertical signal line.

(14) The imaging system of anyone of (11) to (13), wherein the at least one imaging capture parameter is at least one of a frame rate, a capturing distance and an exposure time.

(15) The imaging system of anyone of (11) to (14), wherein the exposure time voltage signal indicates the exposure time by an exposure time voltage signal pulse width, and wherein the auxiliary information voltage signal indicates auxiliary information by at least one of an auxiliary information voltage signal level, an auxiliary information voltage signal pulse width and an auxiliary information voltage signal pattern.

(16) The imaging system of anyone of (11) to (15), wherein the host circuitry is further configured to transmit, from the slave image sensor to the master image sensor, the imaging capture parameter, such that the host circuitry is further configured to adapt at least one of the exposure time voltage signal and the auxiliary information voltage signal according to the at least one imaging capture parameter received from the slave image sensor.

(17) An information processing method, comprising:
generating an exposure time voltage signal being indicative of an exposure time of a master image sensor;
generating an auxiliary information voltage signal being indicative of auxiliary information for adjusting at least one imaging capture parameter of a slave image sensor;
transmitting the exposure time voltage signal and the auxiliary information voltage signal.

(18) The information processing method of (17), further comprising:
generating master imaging frames and slave imaging frames; and
merging the master imaging frames and the slave imaging frames based on the exposure time voltage signal and the auxiliary information voltage signal.

(19) The information processing method of anyone of (17) and (18), wherein the exposure time voltage signal indicates the exposure time by an exposure time voltage signal pulse width, and wherein the auxiliary information voltage signal indicates the auxiliary information by at least one of auxiliary information voltage signal level, auxiliary information voltage signal pulse width and auxiliary information voltage signal pattern.

(20) The information processing method of anyone of (17) to (19), further comprising:
transmitting the imaging capture parameter from the slave image sensor to the master image sensor.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A master image sensor configured to communicate with a slave image sensor via an exposure time voltage line, wherein the exposure time voltage line is connected to a terminal of the master image sensor, the master image sensor comprising master circuitry, configured to:
transmit to the slave image sensor, via the exposure time voltage line, an exposure time voltage signal being indicative of an exposure time of the master image sensor, wherein the exposure time of the master image sensor represents a time interval in which light is acquired by the master image sensor; and
transmit to the slave image sensor, via the exposure time voltage line, an auxiliary information voltage signal being indicative of auxiliary information for adjusting at least one imaging capture parameter of the slave imaging sensor, wherein the at least one imaging capture parameter relates to an imaging process of the slave image sensor.

2. The master image sensor of claim 1, wherein the exposure time voltage line is an external vertical signal line.

3. The master image sensor of claim 1, wherein the at least one imaging capture parameter is at least one of a frame rate, a capturing distance and an exposure time.

4. The master image sensor of claim 1, wherein the exposure time voltage signal indicates the exposure time by an exposure time voltage signal pulse width, and wherein the auxiliary information voltage signal indicates the auxiliary information by at least one of an auxiliary information voltage signal level, an auxiliary information voltage signal pulse width and an auxiliary information voltage signal pattern.

5. The master image sensor of claim 1, wherein the master circuitry is further configured to receive, from the slave image sensor, the at least one imaging capture parameter, such that the circuitry is further configured to adapt at least one of the exposure time voltage signal and the auxiliary information voltage signal according to the at least one imaging capture parameter received from the slave image sensor.

6. A slave image sensor configured to communicate with a master image sensor via an exposure time voltage line, wherein the exposure time voltage line is connected to a terminal of the master image sensor, comprising slave circuitry configured to:
receive from the master image sensor, via the exposure time voltage line, an exposure time voltage signal being indicative of an exposure time of the master image sensor, wherein the exposure time of the master image sensor represents a time interval in which light is acquired by the master image sensor; and
receive from the master image sensor, via the exposure time voltage line, an auxiliary information voltage signal being indicative of auxiliary information for adjusting at least one imaging capture parameter of the slave image sensor, wherein the at least one imaging capture parameter relates to an imaging process of slave image sensor.

7. The slave image sensor of claim 6, wherein the exposure time voltage line is an external vertical signal line.

8. The slave image sensor of claim 6, wherein the at least one imaging capture parameter is at least one of a frame rate, a capturing distance and an exposure time.

9. The slave image sensor of claim 6, wherein the exposure time voltage signal indicates the exposure time by an exposure time voltage signal pulse width and the auxiliary information voltage signal indicates the auxiliary information by at least one of an auxiliary information voltage signal level, an auxiliary information voltage signal pulse width and an auxiliary information voltage signal pattern.

10. The slave image sensor of claim 6, wherein the slave circuitry is further configured to transmit, to the master image sensor, the at least one imaging capture parameter.

11. An imaging system comprising:
an exposure time voltage line;
a master image sensor being connected to the exposure time voltage signal via a terminal of the master image sensor, the master image sensor being configured to communicate with a slave image sensor via the exposure time voltage line;
the slave image sensor; and
host circuitry configured to:
generate an exposure time voltage signal being indicative of an exposure time of the master image sensor, wherein the exposure time of the master image sensor represents a time interval in which light is acquired by the master image sensor;
generate an auxiliary information voltage signal being indicative of auxiliary information for adjusting at least one imaging capture parameter of the slave image sensor, wherein the at least one imaging capture parameter relates to an imaging process of the slave image sensor;
transmit, via the exposure time signal line, the exposure time voltage signal and the auxiliary information voltage signal to the slave image sensor.

12. The imaging system of claim 11, wherein the host circuitry is further configured to:
generate master imaging frames for the master image sensor and slave imaging frames for the slave image sensor; and
merge the master imaging frames and the slave imaging frames based on the exposure time voltage signal and the auxiliary information voltage signal.

13. The imaging system of claim 11, wherein the exposure time signal line is an external vertical signal line.

14. The imaging system of claim 11, wherein the at least one imaging capture parameter is at least one of a frame rate, a capturing distance and an exposure time.

15. The imaging system of claim 11, wherein the exposure time voltage signal indicates the exposure time by an exposure time voltage signal pulse width, and wherein the auxiliary information voltage signal indicates auxiliary information by at least one of an auxiliary information voltage signal level, an auxiliary information voltage signal pulse width and an auxiliary information voltage signal pattern.

16. The imaging system of claim 15, wherein the host circuitry is further configured to transmit, from the slave image sensor to the master image sensor, the at least one imaging capture parameter, such that the host circuitry is further configured to adapt at least one of the exposure time voltage signal and the auxiliary information voltage signal according to the at least one imaging capture parameter received from the slave image sensor.

17. An information processing method, comprising:
generating an exposure time voltage signal being indicative of an exposure time of a master image sensor, wherein the exposure time of the master image sensor represents a time interval in which light is acquired;
generating an auxiliary information voltage signal being indicative of auxiliary information for adjusting at least one imaging capture parameter of a slave image sensor, wherein the at least one imaging capture parameter relates to an imaging process of the slave image sensor;
transmitting the exposure time voltage signal and the auxiliary information voltage signal to the slave image sensor.

18. The information processing method of claim 17, further comprising:
generating master imaging frames and slave imaging frames; and
merging the master imaging frames and the slave imaging frames based on the exposure time voltage signal and the auxiliary information voltage signal.

19. The information processing method of claim 17, wherein the exposure time voltage signal indicates the exposure time by an exposure time voltage signal pulse width, and wherein the auxiliary information voltage signal indicates the auxiliary information by at least one of auxiliary information voltage signal level, auxiliary information voltage signal pulse width and auxiliary information voltage signal pattern.

20. The information processing method of claim 17, further comprising:
transmitting the at least one imaging capture parameter from the slave image sensor to the master image sensor.

* * * * *